United States Patent
Schubert et al.

(10) Patent No.: US 10,709,144 B2
(45) Date of Patent: Jul. 14, 2020

(54) METHOD AND DEVICE FOR DETECTING THE PRONE/SUPINE POSITION OF FISH CONVEYED BY MEANS OF A CONVEYING DEVICE

(71) Applicant: NORDISCHER MASCHINENBAU RUD. BAADER GMBH + CO. KG, Luebeck (DE)

(72) Inventors: Frank Schubert, Hamburg (DE); Jan-Patrick Herbst, Gross Roennau (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/096,040

(22) PCT Filed: Apr. 24, 2017

(86) PCT No.: PCT/EP2017/059616
§ 371 (c)(1),
(2) Date: Oct. 24, 2018

(87) PCT Pub. No.: WO2017/186622
PCT Pub. Date: Nov. 2, 2017

(65) Prior Publication Data
US 2019/0133141 A1     May 9, 2019

(30) Foreign Application Priority Data

Apr. 26, 2016  (DE) .................. 10 2016 107 687

(51) Int. Cl.
*A22C 25/12*  (2006.01)
*A22C 25/08*  (2006.01)
*B65G 47/46*  (2006.01)

(52) U.S. Cl.
CPC .............. *A22C 25/12* (2013.01); *A22C 25/08* (2013.01); *B65G 47/46* (2013.01)

(58) Field of Classification Search
CPC ........ A22C 25/12; A22C 25/08; B65G 47/46; B65G 47/256; B07C 5/342
(Continued)

(56) References Cited

U.S. PATENT DOCUMENTS

| 4,601,083 A | 7/1986 | Shoji |
| 5,013,906 A * | 5/1991 | Miyakawa ............. A22C 25/00 209/588 |

(Continued)

FOREIGN PATENT DOCUMENTS

| DE | 102005007150 | 8/2006 |
| EP | 0 116 782 | 8/1984 |

(Continued)

OTHER PUBLICATIONS

PCT Search Report and Written Opinion issued in PCT/EP2017/059616.

(Continued)

*Primary Examiner* — Gene O Crawford
*Assistant Examiner* — Lester III Rushin
(74) *Attorney, Agent, or Firm* — Greenblum & Bernstein, P.L.C.

(57) ABSTRACT

Method for detecting a prone/supine position of fish conveyed by a conveying device. The method includes conveying the fish with the conveying device in a longitudinal direction, optically scanning a ventral side and a dorsal side of the fish in order to determine a first brightness value profile of a first side and a second brightness value profile of a second side, determining a first ordered data series and a second ordered data series by ordering brightness values of the first brightness value profile and of the second brightness (Continued)

value profile according to a predefined ordering criterion, determining a first median from the first ordered data series and a second median from the second ordered data series, determining at least one differential value from the first median and the second median, and determining the prone/supine position by comparing the at least one differential value with at least one predetermined reference value.

17 Claims, 2 Drawing Sheets

(58) Field of Classification Search
 USPC .......... 356/73, 448, 398; 198/364; 209/577, 209/581, 582, 587
 See application file for complete search history.

(56) References Cited

U.S. PATENT DOCUMENTS

| | | | |
|---|---|---|---|
| 5,115,903 A | 5/1992 | Leander | |
| 5,324,228 A | 6/1994 | Vogeley | |
| 5,591,076 A * | 1/1997 | Evers | A22C 25/00 452/157 |
| 2008/0144011 A1* | 6/2008 | Burmeister | A22C 25/12 356/73 |
| 2011/0207388 A1 | 8/2011 | Hansen | |
| 2016/0000051 A1 | 1/2016 | Goodrick | |
| 2019/0116817 A1 | 4/2019 | Herbst | |
| 2019/0133142 A1 | 5/2019 | Hensel | |
| 2019/0136942 A1 | 5/2019 | Dalgaard-Nielsen | |

FOREIGN PATENT DOCUMENTS

| | | |
|---|---|---|
| EP | 3 000 325 | 3/2016 |
| SU | 663363 | 5/1979 |
| WO | 2014/128230 | 8/2014 |
| WO | 2015/155389 | 10/2015 |

OTHER PUBLICATIONS

German Office Action issued in 10 2016 107 687.2.
Office Action issued in Russian Application No. 2018139816.
Office Action issued in Chilean Application No. 2018003031.

* cited by examiner

METHOD AND DEVICE FOR DETECTING THE PRONE/SUPINE POSITION OF FISH CONVEYED BY MEANS OF A CONVEYING DEVICE

CROSS-REFERENCE TO RELATED APPLICATIONS

The instant application is a US National Stage of PCT/EP2017/059616 filed on Apr. 24, 2017 which application claims priority under 35 USC § 119 of German Application No. 10 2016 107 687.2 filed Apr. 26, 2016.

BACKGROUND OF THE INVENTION

1. Field of the Invention

The present invention concerns a method for detecting the prone/supine position of fish conveyed by way of a conveying device. The invention furthermore concerns a method for monitoring the positionally correct transfer of fish from a transverse conveyor to at least one conveying device for conveying the fish longitudinally. The present invention furthermore comprises an apparatus for detecting the prone/supine position of fish conveyed in the longitudinal direction of the fish, and an apparatus for monitoring the positionally correct transfer of fish from a transverse conveyor to at least one conveying device for conveying the fish longitudinally.

2. Discussion of Background Information

Such apparatuses and methods are used in particular when the orientation of the fish is relevant for their treatment or automatic processing in subsequent fish-processing machines. It is therefore very important to be able to detect the correct prone/supine position automatically, and when an incorrect position is detected, be able to remove the respective fish from the processing line.

Known apparatuses and methods for position detection are usually based on detection of the fish by way of a camera system, and from the image data obtained, checking the correct position or orientation of the fish by way of corresponding algorithms. The disadvantage here is that such image detection systems are on the one hand associated with high costs, and on the other hand require considerable computing power because of the complex image analysis algorithms. The high degree of complexity of the image analysis algorithms amongst others that it takes some time to determine the position of the fish. In particular, with the high throughput rates of fish-processing machines required today which are associated with correspondingly high conveying speeds, ever shorter time periods are available for analysis of the image data recorded for position determination. This means that often, the computing time necessary for analysis of image data prevents high conveying speeds, and hence finally restricts the overall throughput rate. It is therefore an object of the present invention to propose corresponding apparatuses and methods which allow the prone/supine position of fish to be detected as rapidly as possible with comparatively high reliability.

SUMMARY OF THE INVENTION

The object is achieved by the method cited hereinbefore, wherein the method comprises the following steps: Conveying the fish by way of the conveying device in the longitudinal direction of the fish, optically scanning the ventral side and dorsal side of the fish as a pair in order to determine a first brightness value profile of a first side and a second brightness value profile of a second side of one of the fish, each, by way of optical scanning, determining a first ordered data series and a second ordered data series by ordering brightness values of the first brightness value profile and of the second brightness value profile according to a predefined ordering criterion, determining a first median from the first ordered data series and a second median from the second ordered data series, determining at least one differential value from the first median and the second median, and determining the prone/supine position by comparing the at least one differential value with at least one predetermined reference value.

The method according to the invention offers the advantage that this firstly has a low algorithmic complexity and therefore the prone/supine position is determined within a very short time. It is therefore possible for the first time to detect the prone/supine position immediately before the downstream fish-processing machine, since because of the relatively short evaluation duration it is possible to detect an incorrect position of the fish immediately before the fish-processing machine and the respective fish can be ejected immediately.

Said brightness value profiles each comprise brightness values of the ventral and dorsal sides of the respective scanned fish which have been detected with the optical sensor.

A preferred refinement of the invention is distinguished in that the first ordered data series and the second ordered data series are ordered by size. The ordering criterion therefore comprises in any case a specification for sorting the data or brightness values by size.

According to a further preferred embodiment, as the first median, a first central value of the first ordered data series is determined, and as the second median, a second central value of the second ordered data series is determined. In this way, from the first ordered data series and the second ordered data series, the brightness values are extracted which have the highest significance for the prone/supine position detection. Possible measuring errors and optical interference therefore have no negative effect on the quality of the position detection. A further advantage is that extracting said medians and using these to detect the prone/supine position reduces the necessary computing complexity to a minimum, so that it is possible to establish the prone/supine position of the fish within a very short time while always retaining a high detection accuracy.

A further preferred embodiment of the invention is distinguished in that the paired optical scanning takes place by way of mutually opposing optical scanning. In this way, even if the fish is not precisely aligned in the longitudinal direction of the fish, a high reliability of the prone/supine position detection is guaranteed. In principle, the fish are conveyed by way of the conveying device in the longitudinal direction of the fish, i.e. head or tail first.

According to a suitable embodiment of the invention, the paired optical scanning takes place by way of laser light. In other words, the ventral and dorsal sides of the fish are exposed to laser light. Because of the high intensity of the laser light, even the light quantities reflected from the ventral and dorsal sides of the fish have high contrast ratios which are detected with the optical scanning. Because of the high contrast ratios and the associated light quantities, high conveying speeds can be achieved with a consistently high accuracy of the prone/supine position detection.

A further suitable embodiment of the invention provides that the paired optical scanning takes place by way of light in the red or infrared wavelength range. According to a further advantageous embodiment of the invention, the determined prone/supine position is compared with the predefined nominal position, and if the determined prone/supine position does not correspond to the predefined nominal position, the respective fish is removed from the conveying device by ejection.

Furthermore, the object is achieved by a corresponding method with the features cited hereinbefore, wherein the method comprises the following steps: Transverse conveying of the fish by way of the transverse conveyor transversely to the longitudinal direction of the fish, transfer of the fish to the at least one conveying device which is configured to convey the fish in the longitudinal direction of the fish, wherein the monitoring of the positionally correct transfer takes place using a method for detecting the prone/supine position. Due to the high speed of detection of the prone/supine position, it is possible for the first time to detect the prone/supine position after transfer of the fish from the transverse conveyor to the conveying device for conveying the fish longitudinally. The prone/supine position is thus detected in the region of the conveying devices shortly before the fish enter the downstream fish-processing machine to which they are to be supplied.

The object is furthermore achieved by the apparatus cited hereinbefore for detecting the prone/supine position of fish conveyed in the longitudinal direction of the fish, wherein the apparatus comprises:

A conveying device configured to convey the fish in the longitudinal direction of the fish; optical scanning which are designed and configured for optically scanning the ventral side and the dorsal side of the fish as a pair, and for determining a first brightness value profile of a first side and a second brightness value profile of a second side of a respective fish; an evaluation device which is configured to determine a first ordered data series and a second ordered data series by ordering brightness values of the first brightness value profile and the second brightness value profile according to a predefined ordering criterion, determine a first median from the first ordered data series and a second median from the second ordered data series, and determine at least one differential value from the first median and the second median, wherein the evaluation device is furthermore configured to determine the prone/supine position by comparing the at least one differential value with at least one predefined reference value.

A suitable development of the invention provides that the evaluation device is configured to order the first ordered data series and the second ordered data series by size.

According to a further advantageous development of the invention, the evaluation device is configured to determine, as the first median, a first central value of the first ordered data series, and as the second median, a second central value of the second ordered data series.

A suitable development of the invention provides that the optical scanning are arranged opposite each other on the conveying device.

An advantageous development of the invention is distinguished in that the optical scanning comprise laser light sources.

An advantageous embodiment of the invention provides that the optical scanning are configured to scan by way of light in the red or infrared wavelength range.

According to an advantageous development of the invention, it is provided that the apparatus according to the invention furthermore comprises a discharge device which is configured so as to be controllable, wherein the discharge device is connected to the evaluation device and is configured to compare the determined prone/supine position with a predefined nominal position and, if the determined prone/supine position does not correspond to the predefined nominal position, to cause the discharge device to remove the respective fish from the conveying device by ejection.

Furthermore, the object is achieved by the apparatus cited hereinbefore for monitoring the positionally correct transfer of fish from a transverse conveyor to at least one conveying device for conveying the fish longitudinally. This comprises a transverse conveyor configured to convey the fish transversely to the longitudinal direction of the fish, at least one transfer device which is configured to transfer the fish to the at least one conveying device, and an apparatus for detecting the prone/supine position as described above.

To avoid repetition, with regard to the advantages of the apparatuses according to the invention, reference is made to the advantages cited in connection with the respective method. The statements there apply accordingly to the apparatuses according to the invention.

BRIEF DESCRIPTION OF THE DRAWINGS

Further preferred and/or suitable features and embodiments of the invention arise from the sub-claims and the description. Particularly preferred embodiments are explained in more detail with reference to the attached drawings. The drawings show:

DETAILED DESCRIPTION OF THE INVENTION

Figure 1:
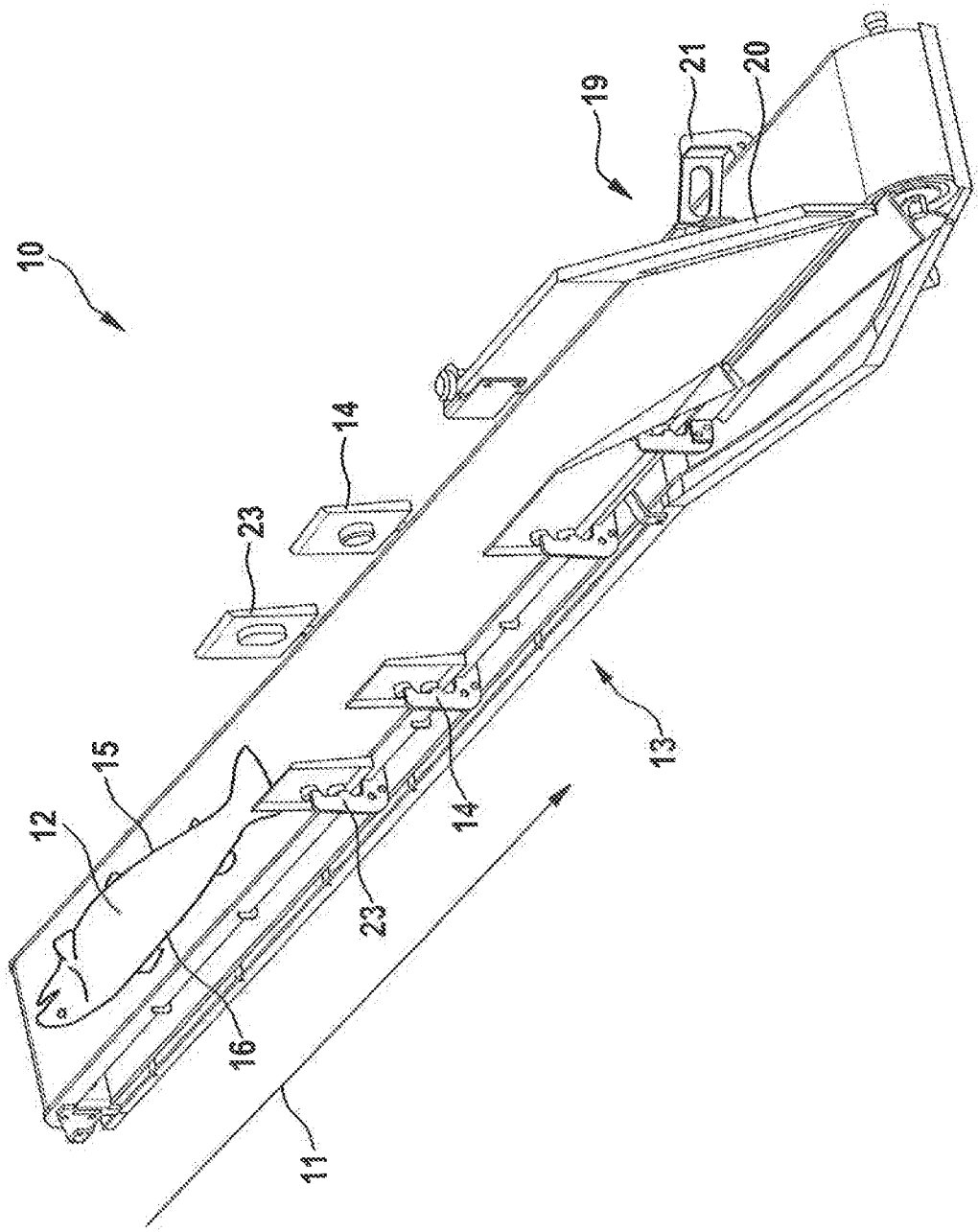
FIG. 1 a perspective view of the apparatus according to the invention.

The apparatuses according to the invention and the methods according to the invention are described in more detail below with reference to FIGS. 1 and 2. FIG. 1 shows an apparatus 10 for detecting the prone and supine position of fish 12 conveyed in the longitudinal direction 11 of the fish. The apparatus 10 comprises a conveying device 13 which is configured to convey the fish 12 in the longitudinal direction 11 of the fish. The longitudinal direction 11 of the fish designates the longitudinal axis of the fish 12, i.e. a theoretical connecting line between the head and tail of the fish 12. The conveying device 13, as shown in FIG. 1, is preferably configured as a continuously rotating conveyor belt. The fish 12 are conveyed by way of the conveying device 13 in the longitudinal direction 11 of the fish, i.e. either head first or tail first. The apparatus according to the invention furthermore comprises optical scanning device 14 which are designed and configured for optical scanning of the ventral side 15 and the dorsal side 16 of the fish 12 as a pair. The optical scanning device 14 are furthermore configured to determine a first brightness value profile of a first side and a second brightness value profile of a second side of a respective fish 12. Preferably, the optical scanning device 14 are each arranged at the side of the conveying device 13 while the fish 12 are conveyed in the longitudinal direction by way of the conveying device 13.

Preferably, the optical scanning device are configured as contrast sensors, and are designed to output the measured contrast or brightness values sequentially as analogue or digital signals.

Figure 2:
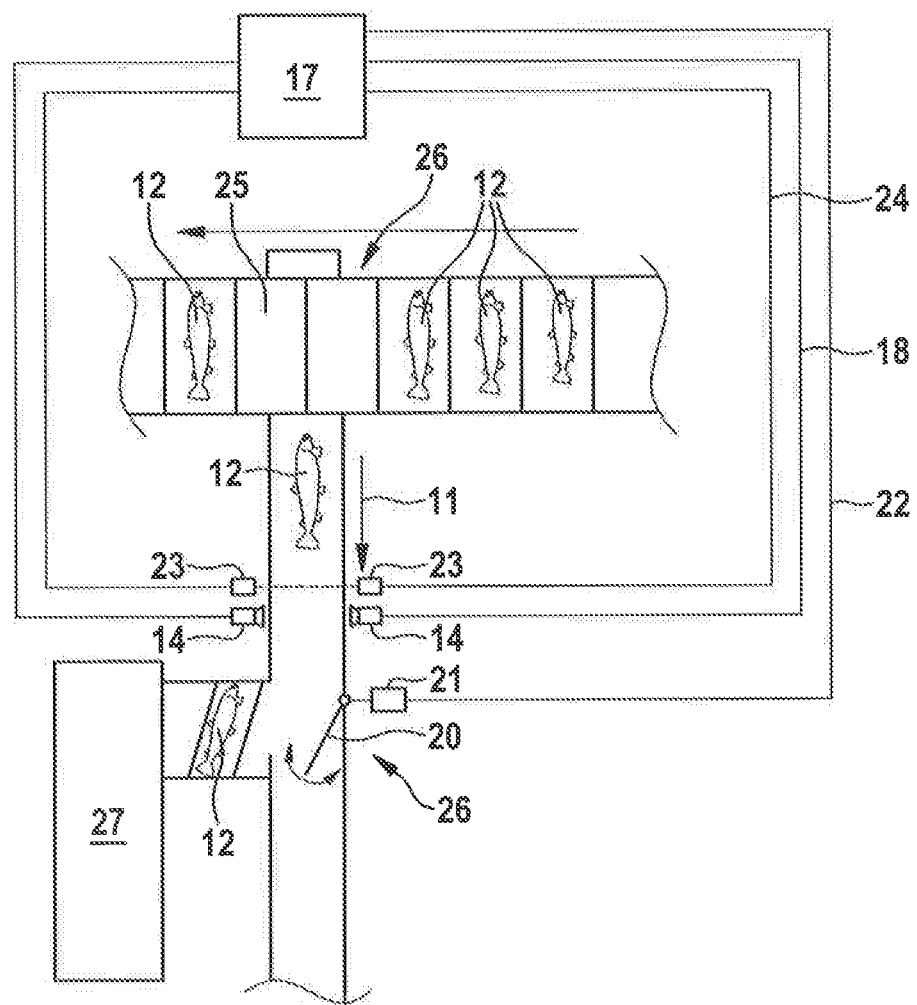
FIG. 2 a diagrammatic depiction of the apparatus according to the invention with the discharge device which is configured so as to be controllable.

The present invention furthermore comprises an evaluation device 17—shown in FIG. 2—which is connected via corresponding signal lines 18 to the optical scanning device 14. The evaluation device 17 is configured to determine a first ordered data series and a second ordered data series by ordering brightness values of the first brightness value profile and the second brightness value profile according to a predefined ordering criterion. In other words, the evaluation device 17 is configured to determine correspondingly ordered data series from the brightness values of the first brightness value profile and the second brightness value profile determined by way of the optical scanning device 14. The evaluation device 17 is furthermore configured to determine a first median from the first ordered data series, and a second median from the second ordered data series. The median corresponds to a brightness value taken from the respective brightness value profile, wherein the position of the brightness value taken from the brightness value profile may be predefined as desired.

The evaluation device 17 is furthermore configured to determine at least one differential value from the first median and the second median, and to determine the prone/supine position of the respective fish 12 by comparing the at least one differential value with at least one predefined reference value. Because of the differing intensity of brightness on the ventral and dorsal sides of the fish 12, from the differential value it is possible to determine whether the first side is the ventral side 15 or the dorsal side 16, and whether the second side is the dorsal side 16 or the ventral side 15. A further suitable embodiment of the invention is distinguished in that the evaluation device is configured to order the first ordered data series and the second ordered data series by size. The brightness values of the first brightness value profile and the second brightness value profile are in this way each ordered by size in order to determine the first ordered data series and the second ordered data series. In particular, the evaluation device 17 is configured to determine, as the first median, a first central value from the first ordered data series, and as the second median, a second central value from the second ordered data series. In other words, the evaluation device 17 is configured to determine the brightness value situated in the central position of the first and second brightness value profiles as the first median and second median respectively. This offers the advantage that locally limited interference in the respective brightness value profile has no direct effect on the determination of the prone/supine position of the fish 12.

A further suitable embodiment of the invention provides that the optical scanning device 14 are arranged opposite each other on the conveying device 13. The paired optical scanning therefore takes place each time by way of mutually opposing optical scanning device 14.

Furthermore preferably, the optical scanning device comprise laser light sources. Preferably, the laser light sources are configured as linear lasers so that the brightness profiles of the ventral and dorsal sides of the fish 12 are scanned optically at least substantially over the entire fish cross-section.

Furthermore preferably, it is provided that the optical scanning device 14 are configured to scan by way of the light in the red or infrared wavelength range. According to a further preferred embodiment of the invention, a discharge device 19 is provided which is configured so as to be controllable and connected to the evaluation device 17; it is also configured such that the determined prone/supine position is compared with a predefined nominal position and, if the determined prone/supine position does not correspond to the predefined nominal position, to cause the discharge device 19 to remove the respective fish 12 from the conveying device 13 by ejection. For this, for example, a pivotable deflector element 20 is provided which is configured so as to be movable under control by way of actuator 21. The actuator 21 is connected to the evaluation device 17 via a further signal line 22, so that in the case of a detected incorrect prone/supine position, the deflector element 20 of the discharge device 19 is actuated to eject the respective fish 12.

Optionally, a light barrier 23 is arranged on the conveying device 13, by way of which the passage of a fish 12 in the region of the optical scanning device 14 is detected. For this, the light barrier 23 is preferably connected via a signal line 24 to the evaluation device 17.

With reference to FIG. 2, the apparatus 10 according to the invention will be explained in more detail below together with the method according to the invention for monitoring the positionally correct transfer of the fish 12 from a transverse conveyor 25 to the at least one conveying device 13 for conveying the fish 12 longitudinally. By way of a transfer device 26, which is indicated merely diagrammatically in FIG. 2 and configured to transfer the fish 12 to the at least one conveying device 13, the fish 12 are taken from the transverse conveyor 25 and then conveyed in the longitudinal direction of the fish by way of the conveying device 13. By way of the apparatus 10 described hereinbefore for detecting the prone/supine position, any mis-orientation of the fish 12 occurring on transfer of the fish from the transverse conveyor 25 to the at least one conveying device 13 can be reliably detected, and if necessary any fish 12 for which the prone/supine positional orientation on longitudinal conveying does not correspond to the desired nominal position, can be detected automatically and ejected by way of the discharge device 19 into the collecting device 27. The ejected fish 12 in the collecting device 27 may be returned to the conveying or treatment process both manually or also automatically, for example by a return device (not shown in the figures).

According to a further advantageous embodiment of the invention (not shown in detail in the drawing), the fish 12 with the desired prone/supine position are extracted from the conveying device 13 laterally by way of a distribution element which is movable under control, and supplied to a downstream fish-processing machine. If the determined prone/supine position does not correspond to specification, the respective fish 12 is left on the conveying device 13 by way of the distribution element, i.e. not supplied to the fish-processing machine.

The invention claimed is:

1. A method for detecting a prone/supine position of fish conveyed by a conveying device, comprising:
   conveying the fish with the conveying device in a longitudinal direction of the fish;
   optically scanning, with an optical scanning device, a ventral side and a dorsal side of the fish as a pair in order to determine a first brightness value profile of a first side and a second brightness value profile of a second side of one of the fish;
   determining a first ordered data series and a second ordered data series by ordering brightness values of the first brightness value profile and of the second brightness value profile according to a predefined ordering criterion;
   determining a first median from the first ordered data series and a second median from the second ordered data series;

determining at least one differential value from the first median and the second median; and determining the prone/supine position by comparing the at least one differential value with at least one predetermined reference value.

2. The method according to claim 1, wherein the first ordered data series and the second ordered data series are ordered by size.

3. The method according to claim 2, wherein the first median is a first central value of the first ordered data series, and the second median is a second central value of the second ordered data series.

4. The method according to claim 1, wherein the optical scanning device comprises mutually opposing optical scanning devices.

5. The method according to claim 1, wherein the optical scanning device utilizes laser light.

6. The method according to claim 1, wherein the optical scanning device utilizes light in the red or infrared wavelength range.

7. The method according to claim 1, wherein the determined prone/supine position is compared with the predefined nominal position and, if the determined prone/supine position does not correspond to the predefined nominal position, the respective fish is removed from the conveying device by ejection.

8. A method for monitoring a positionally correct transfer of fish from a transverse conveyor to at least one conveying device for conveying the fish longitudinally utilizing the method of claim 1, comprising:

transverse conveying of the fish by the transverse conveyor transversely to the longitudinal direction of the fish; and transferring the fish to the at least one conveying device which is configured to convey the fish in the longitudinal direction of the fish.

9. An apparatus for detecting the prone/supine position of fish conveyed in a longitudinal direction of the fish, comprising:

a conveying device configured to convey the fish in the longitudinal direction of the fish;

an optical scanning device designed and configured for optically scanning a ventral side and a dorsal side of the fish as a pair, and configured for determining a first brightness value profile of a first side and a second brightness value profile of a second side of a respective fish;

an evaluation device configured to:
determine a first ordered data series and a second ordered data series by ordering brightness values of the first brightness value profile and the second brightness value profile according to a predefined ordering criterion;

determine a first median from the first ordered data series and a second median from the second ordered data series; and determine at least one differential value from the first median and the second median, wherein the evaluation device is furthermore configured to determine the prone/supine position by comparing the at least one differential value with at least one predefined reference value.

10. The apparatus according to claim 9, wherein the evaluation device is configured to order the first ordered data series and the second ordered data series by size.

11. The apparatus according to claim 10, wherein the evaluation device is configured to determine, as the first median, a first central value of the first ordered data series, and as the second median, a second central value of the second ordered data series.

12. The apparatus according to claim 9, wherein the optical scanning device comprises optical scanning devices arranged opposite each other on the conveying device.

13. The apparatus according to claim 9, wherein the optical scanning device comprises laser light sources.

14. The apparatus according to claim 9, wherein the optical scanning device is configured to scan light in the red or infrared wavelength range.

15. The apparatus according to claim 9, further comprising a discharge device configured so as to be controllable and being connected to the evaluation device.

16. An apparatus for monitoring a positionally correct transfer of fish from a transverse conveyor to at least one conveying device for conveying the fish longitudinally, comprising:

a transverse conveyor for conveying the fish transversely to the longitudinal direction of the fish;

at least one transfer device configured to transfer the fish to the at least one conveying device; and the apparatus according to claim 9.

17. The apparatus according to claim 15, wherein the evaluation device is configured to compare the determined prone/supine position with a predefined nominal position and, if the determined prone/supine position does not correspond to the predefined nominal position, to cause the discharge device to remove the respective fish from the conveying device by ejection.

* * * * *

UNITED STATES PATENT AND TRADEMARK OFFICE
CERTIFICATE OF CORRECTION

PATENT NO. : 10,709,144 B2  
APPLICATION NO. : 16/096040  
DATED : July 14, 2020  
INVENTOR(S) : Frank Schubert et al.

Page 1 of 1

It is certified that error appears in the above-identified patent and that said Letters Patent is hereby corrected as shown below:

On the Title Page

Column 1, items (71) Applicant; (72) Inventors, which read:
"(71) Applicant: NORDISCHER MASCHINENBAU RUD. BAADER GMBH + CO. KG, Luebeck (DE)"

"(72) Inventors: Frank Schubert, Hamburg (DE); Jan-Patrick Herbst, Gross Roennau (DE)"

Should read:
--"(71) Applicant: NORDISCHER MASCHINENBAU RUD. BAADER GMBH + CO. KG, Lübeck (DE)"--

--"(72) Inventors: Frank Schubert, Hamburg (DE); Jan-Patrick Herbst, Groß Rönnau (DE)"--

Signed and Sealed this  
First Day of September, 2020

Andrei Iancu  
*Director of the United States Patent and Trademark Office*